United States Patent [19]

Bronnec

[11] 4,261,827

[45] Apr. 14, 1981

[54] FLEXIBLE BLADE APPARATUS FOR THE RECOVERY OF FLOATING MATERIAL

[75] Inventor: Jean A. L. Bronnec, Brest, France

[73] Assignee: Etablissements Generaux de Mecanique de l'Quest, Brest, France

[21] Appl. No.: 48,089

[22] Filed: Jun. 13, 1979

[30] Foreign Application Priority Data

Jun. 14, 1978 [FR] France .............................. 78 17724

[51] Int. Cl.³ .......................................... E02B 15/04
[52] U.S. Cl. ............................... 210/242.3; 210/400; 210/526; 210/923
[58] Field of Search ..................... 210/242.5, DIG. 25, 210/DIG. 26, 400, 401, 526

[56] References Cited

U.S. PATENT DOCUMENTS

| 2,267,086 | 12/1941 | Donohue | 210/526 |
|---|---|---|---|
| 2,660,310 | 11/1953 | Hapman | 210/526 |
| 3,146,192 | 8/1964 | McClintuk | 210/DIG. 26 |
| 3,204,773 | 9/1965 | Lind | 210/526 X |
| 3,403,098 | 9/1968 | Hiw | 210/526 X |
| 3,613,891 | 3/1970 | Cloutier | 210/242.5 |
| 3,623,609 | 12/1969 | Amloy | 210/242 |
| 3,762,558 | 10/1973 | Anderson | 210/400 |
| 3,928,206 | 12/1975 | Walon | 210/242.5 |
| 3,975,275 | 8/1976 | Kato | 210/400 |

FOREIGN PATENT DOCUMENTS

| 760199 | 2/1971 | Belgium | 210/242.5 |
|---|---|---|---|
| 959423 | 12/1974 | Canada . | |
| 2229260 | 11/1974 | France | 210/DIG. 25 |

Primary Examiner—Theodore A. Granger
Attorney, Agent, or Firm—Sandler & Greenblum

[57] ABSTRACT

The apparatus comprises an endless belt carrying a plurality of flexible blades the belt being mounted between two end drums above a guideway parallel to the lower side of the belt. The belt is extended at its lower portion by an inlet chute. The bottom of the inlet chute forms a hogback shape hump whose top, intended to be brought beneath the floating layer of material to be recovered, is arranged substantially vertically over the point where the transverse edge of the flexible blades comes into contact with the water sheet. A tendency to back-flow of the polluting material is thus compensated.

10 Claims, 4 Drawing Figures

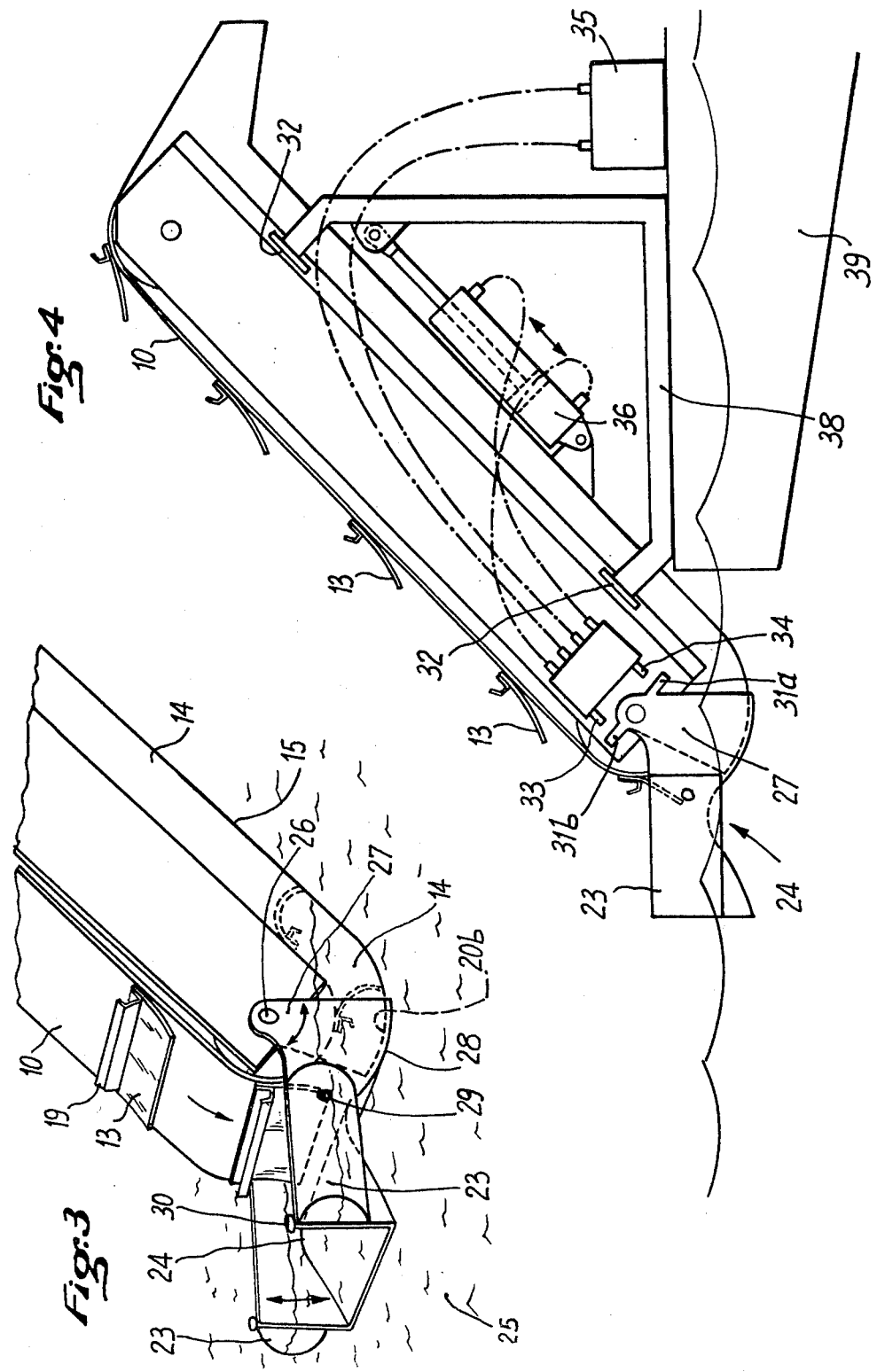

FLEXIBLE BLADE APPARATUS FOR THE RECOVERY OF FLOATING MATERIAL

BACKGROUND OF THE INVENTION

1. Field of the Invention

The invention relates to apparatus for combatting floating pollution whose inlet is in the form of a flexible blade pump, extended then by a blade elevator.

2. Description of the Prior Art

Such apparatus is known, for example from French Pat. No. 2,229,260. They include an inclined flexible endless belt, mounted on two end drums and bearing a plurality of flexible plates, and a guideway of U-shaped cross-section whose bottom is parallel to the lower side of the belt, the flexible plates having a width substantially equal to that of the guideway and a height such that their free transverse edge comes into rubbing engagement against the bottom of said guideway. At the lower part of the apparatus, the guideway is extended by an inlet chute whose lateral sides are generally flared and whose bottom is flat and substantially horizontal. To recover floating material (bodies of small size or liquid material such as petroleum) the bottom of the inlet chute is placed at a shallow depth below the material to be recovered, the belt is then put into motion by driving one of the drums, the flexible plates "lap" the surface of the sheet of water and entrap the floating products in successive cavities to discharge them at the upper part of the belt through an evacuation chute, for example, into a decantation tank.

The results obtained are satisfactory and, at least, it is the apparatus of this type which gives the best results notably in combatting "oil spills". However, their yield is offset by the backflow which is generated at the point where the flexible plates for blades come into contact with the sheet of water.

It is an object of the invention to provide arrangements which notably reduce this backflow.

Other objects and advantages of the invention will emerge from the description which follows.

GENERAL DESCRIPTION OF THE INVENTION

According to the invention there is provided on the bottom of the inlet chute, a hogback hump whose top, designed to be brought below the floating layer of material to be recovered, is placed substantially vertically below the point at which the flexible plates come into contact with the sheet of water.

It is advantageous to bring the top of the hump into the immediate vicinity of the floating layer of material, but since this top must be at the same time substantially vertically under the above-mentioned point of contact, the two conditions are only theoretically compatible for a given thickness of the floating layer. However, if this thickness can vary from that of a film to reach several centimeters, it still remains small and it is possible to remain in all cases very close to optimal conditions.

The bank or slope upstream of the hump may be of any type but, of course, the downstream bank must be formed by a bent surface which is attached to the bottom of the guideway.

According to another feature, for a given speed of passage of the blade-holder belt, that is to say for a given peripheral speed of the drums, the diameter of the lower drum is increased as much as possible, so as to reduce the vertical component of said peripheral speed at the lower portion of said drum in order to reduce the speed of penetration of the blades.

BRIEF DESCRIPTION OF THE DRAWINGS

The invention will be better understood on reading the description which follows in conjunction with the accompanying drawings in which:

FIG. 3 shows the apparatus with an articulated inlet chute and,

FIG. 4 shows the same apparatus with servo-coupling in height.

DESCRIPTION OF PREFERRED EMBODIMENTS

Figure 1:
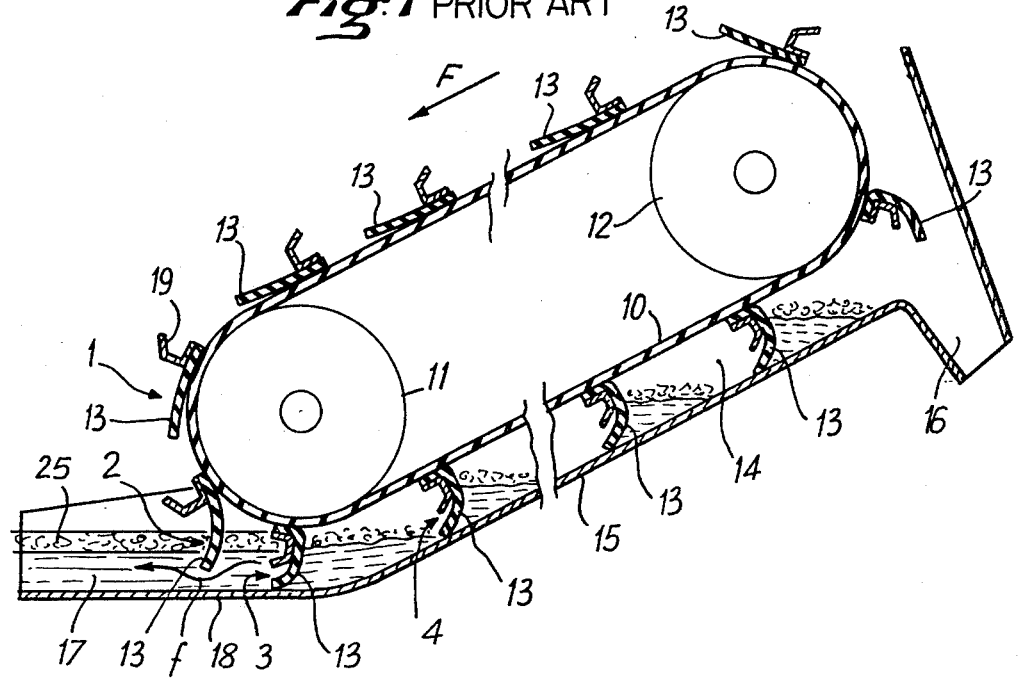
FIG. 1 shows a conventional arrangement of an apparatus of the type to which the invention is directed.

In FIG. 1, an apparatus for combatting floating pollution comprises, in known manner, an inclined flexible belt 10 mounted on two end drums 11 and 12 and bearing a plurality of flexible plates 13 and a guideway 14 of U-shaped cross-section shows bottom 15 is parallel to the lower side of the belt 10. The belt has an inner and an outer surface. The plates 13 have a width substantially equal to that of the guideway 14 and a height such that their free transverse edge comes to rub against the bottom 15. At the upper end of the guideway 14 is arranged an evacuation chute 16 and at its lower end the guideway is extended by an inlet chute 17 whose bottom 18 is flat and substantially horizontal. Of course, one of the drums, preferably the upper drum 12, is a drive drum and draws the belt in the direction of the arrow F. It must be noted that for gathering solid substances notably, the direction of rotation may be reversed, the gathering then being effected by the rigid elements 19 associated respectively with each plate 13, but this method of use is not concerned by the present invention.

It is clear that in bringing the bottom 18 of the chute 17 beneath the layer of floating material, the plate 13, "lap" the upper portion of the sheet of water and imprison the floating material in the successive cavities that they form with the walls and the bottom of the guideway 14. The floating materials are thus lifted to the upper end of the guideway and are discharged through the evacuation chute 16 into a decantation tank (not shown).

In position 1 the plate is tangential to the drum 11, in position 2 it is incurved under the effect of the resistance of the liquid and remains thus incurved in position 3 when it begins to touch the bottom 15 of the guideway and in position 4 during the whole reascent of the guideway.

In position 2 and neighboring positions, more precisely for all positions of the plates comprised between that where the free transverse edge of the plate concerned takes contact with the sheet of water and that where this free edge becomes urged against the bottom 15 (position 3), streams of water tend to escape along the arrow F and create, for this reason, a back-flow which separates the floating sheet from the inlet chute although it is sought to draw it in.

According to the invention the back-flow is diminished by reducing the vertical component of the speed of penetration of the blades into the water sheet and may even be practically eliminated by arranging on the bottom of the inlet chute a hump preventing any "backflow" beneath the free edge of the blades.

Figure 2:
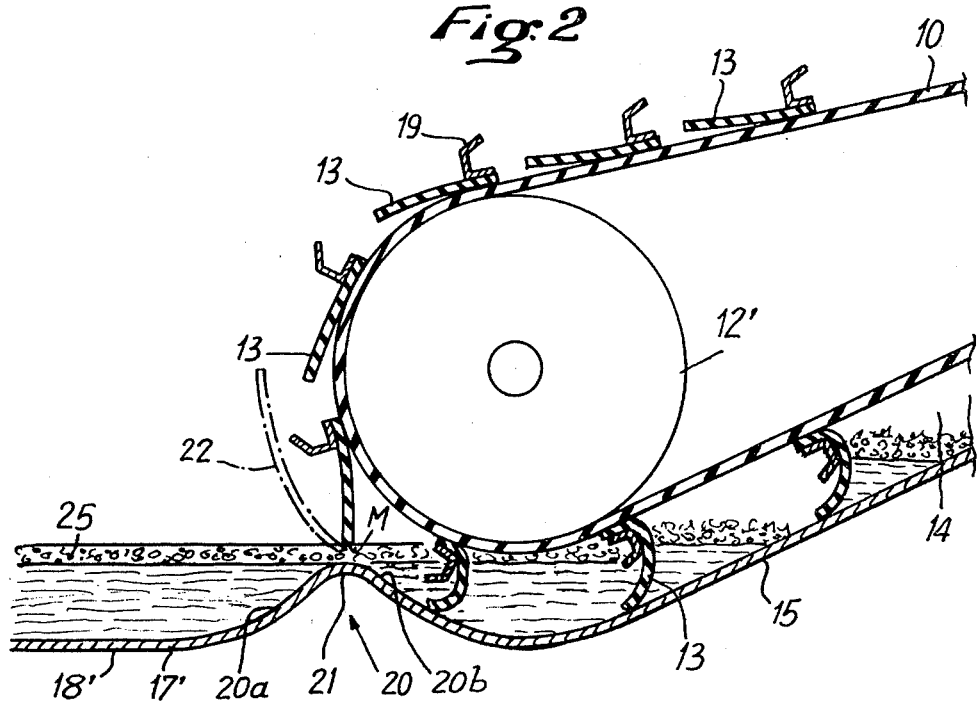
FIG. 2 is a partial view of an apparatus similar to that of FIG. 1, but in which the improvements according to the invention have been incorporated.

In FIG. 2 the apparatus for combatting pollution comprises these two improvements provided by the invention but it must be well understood that these improvements are independent of one another and may be used separately or in combination.

For a given speed of passage of the belt 10, which speed is defined by the angular speed of the drive drum (upper drum), the reduction of the vertical component of the speed of penetration of the blades into the water sheet is obtained by increasing the diameter of the lower drum within the limits of the admissible size. In FIG. 2, this increase of diameter of the lower drum 12′ is illustrated by the fact that the two strands of the belt 10 have directions which converge upwardly.

In FIG. 2 again, the bottom 18′ of the chute 17′ forms or carries a hogbacked hump 20. During the positioning of the apparatus the top 21 of this hump is brought as close as possible to the lower limit of the floating layer 20 and the height of the hump is such that for an average thickness of said layer said top 21 is then substantially vertically below the point M where the free transverse edge of the blades 13 entered into contact with the water sheet.

The upstream slope 20$_a$ of the hump may be of any shape, even vertical in limit, but the downstream slope 20$_b$ must be in contact with the transverse edge of the blades as close as possible to the top 21.

It is also necessary, to ensure good "aspiration" of the floating layer, that is to say to prevent troublesome back-flows, for the lower edge of each blade to cut said layer freely. The incurving of the blade towards upstream must hence be avoided in being urged onto the polluting layer even if it is constituted by a thick substance. This is why one embodiment provides at least two narrow curved guides arranged facing the lower drum, having a center of curvature situated substantially on the axis of said drum and each having their lower end placed in the immediate vicinity at the top of the hump.

Such an arrangement is shown in mixed lines in FIG. 2: facing each end of the roll 12′ is arranged a guide 22 constituted by a curved blade of 1 to 2 cm with substantially concentric with said roll and whose lower end is extended up to the vicinity of the top 21 of the hump 20, under point M. Thus each flexible blade is engaged in turn beneath the guides 22 at each of its ends. At the moment when it touches the liquid surface, which tends to curve it back towards the left of FIG. 2, it remains held until it arrives in the immediate proximity of the sill formed by the hump 20. The angle of attach of the polluting layer is thus fully defined. The slight width of the guides leaves the blade the necessary flexibility to "absorb" possible solid objects without risk of blocking or breaking.

As has been stated above, the sill formed by the top 21 of the hump 20 must be brought into the immediate vicinity of the lower surface of the floating layer, so it is necessary for the level of the sill below the liquid surface to be substantially constant, which cannot be done without particular arrangements when the said surface is agitated.

When the surface is agitated with slight movements not having the effect of modifying the position of the barge or other floating vessel carrying the apparatus, it is possible to provide an articulated sill as shown in FIG. 3. Here the inlet sill 24 forms part of a sheet material metal structure provided with two hemicylindical hollow floats 23 and articulated freely around an axis 26 through two lugs 27. Preferably the pivoting axle 26 coincides substantially with the axis of rotation of the lower drum so as to be at the same time the axis of the cylindrical surface 28 envelopping the lower portion of the reascent guideway 14 which forms the foot of the downstream bank 20$_b$ of the hump.

Thus the sill follows substantially the movements of the liquid surface by swinging around the axis 6 under the effect of the float 23. To facilitate the initial adjustment and to bring the top of the bump 24 as close as possible to the lower surface of the polluting layer, it is advantageous to provide movable and adjustable floats. In FIG. 3, each float 23 is pivoted around an axle 29 at one of its ends whilst the other end can be adjusted in height by means of a screw 30.

This arrangement is satisfactory for hollows of of the order of 10 to 20 cm but difficult beyond this. If it is desired to compensate for relative plunging of the floating carrying vessel going for example up to 50 cm, it is necessary for the whole apparatus to rise or fall following substantially the profile of the waves.

FIG. 4 shows a solution to this problem. The floats 23 govern through the structure of the sill, for example fingers 31$_a$ and 31$_b$ carried by a lug 27, two pushers 33 and 34 of a hydraulic distributor connected on the one hand to a hydraulic pump 35 and on the other hand to a double-acting hydraulic jack 36. The whole of the apparatus is arranged on slides 32 borne by a frame 38 fixed to the rear of a carrying barge 39. When the floats drop into a wave hollow they first perform their task of regulating the height of the sill then beyond a certain amplitude of swing, the finger 31$_a$ actuates the push rod 34 and the distributor admits hydraulic pressure into the upper chamber of the jack 36 thus actuating the lowering of the apparatus along the slides 37. The reverse phenomenon occurs if the floats rise; the finger 31$_b$ actuates the push rod 3, the lower chamber of the jack 36 is supplied and the apparatus rises again along the slides 32.

Of course, any other system than slides may be envisaged, for example a rotary axle at the upper part, the jack then actuating the pivoting around this axle.

The motor pump unit 35 may be the same at that supplying a hydraulic motor driving the belt 10 and, especially in the latter case, it is advantageous to provide for this group an energy accumulator, for example of the compressed air and diaphragm type, in order to obtain more rapid reactions of the jack.

I claim:

1. Apparatus for the recovery of floating material from a water surface, said apparatus comprising an inclined flexible endless belt having an inner and an outer surface and mounted about portions of the peripheries of both a lower and an upper drum such that a lower belt side will be formed, a plurality of flexible blades attached to said outer belt surface, a guideway located generally parallel to said lower side and below said belt as the belt moves about said drums, an inlet chute having a substantially horizontal axis extending from a lower portion of said guideway, part of said chute comprising a hogback hump located adjacent to said lower drum, whereby the hump is positioned such that when said drums rotate, the flexible blades move about said drums and each of the blades which move about said lower drum moves into a substantially vertical position with a transverse edge thereof closely adjacent to said hogback hump.

2. Apparatus for the recovery of floating material according to claim 1, wherein at least two narrow curved guides are arranged facing the lower drum, their center of curvature being situated substantially on the axis of said drum and the lower end of each is situated in the immediate vicinity of the top of the hump.

3. Apparatus for the recovery of floating material according to claim 1, wherein the inlet chute with its hump constitutes a structure provided with floats and articulated freely around an axis at the base of the ascending guideway.

4. Apparatus for the recovery of floating material according to claim 3, wherein the articulation axis of the inlet chute coincides substantially with the axis of rotation of the lower drum.

5. Apparatus for the recovery of floating material according to claim 4, wherein the whole of the apparatus is mounted on a frame so that at least its lower end bearing the articulated inlet chute can be regulated in height with respect to the surface of the sheet of water.

6. Apparatus for the recovery of floating material according to claim 5, wherein the movements of the apparatus with respect to the frame are controlled by the tilting of the inlet chute in one direction or the other, through the distributor of a hydraulic jack.

7. Apparatus for the recovery of floating material according to claim 6, wherein the hydraulic jack is supplied by a motor pump unit in common with the hydraulic drive motor for the belt and this unit is associated with an energy accumulator.

8. Apparatus for the recovery of floating material according to claim 3, wherein the whole of the apparatus is mounted on a frame so that at least its lower end bearing the articulated inlet chute may be adjusted in height with respect to the surface of the sheet of water.

9. Apparatus for the recovery of floating material according to claim 8, wherein the movements of the apparatus with respect to the frame are controlled by the tilting of the inlet chute in one direction or the other, through the distributor of a hydraulic jack.

10. Apparatus for the recovery of floating material according to claim 9, wherein the hydraulic jack is supplied by a motor pump unit in common with the hydraulic drive motor of the belt and this unit is associated with an energy accumulator.

* * * * *

UNITED STATES PATENT AND TRADEMARK OFFICE
CERTIFICATE OF CORRECTION

PATENT NO. : 4,261,827
DATED : April 14, 1981
INVENTOR(S) : Jean A. L. BRONNEC

It is certified that error appears in the above—identified patent and that said Letters Patent is hereby corrected as shown below:

Column 1, line 37, "for" should be --or--.
Column 3, line 44, "with" should be --width--;
          line 52, "attach" should be --attack--; and
          line 68, "material" should be deleted.
Column 4, line 12, "bump" should be --hump--; and
          line 18, "of" (first occurrence) should be deleted.

Signed and Sealed this

Eighth Day of September 1981

[SEAL]

Attest:

Attesting Officer

GERALD J. MOSSINGHOFF

Commissioner of Patents and Trademarks